United States Patent Office 3,090,812
Patented May 21, 1963

3,090,812
METHOD OF PRODUCING ISONITROSO-
PROPIOPHENONE
Godfrey Wilbert, Carmel, N.Y., and Paul Sosis, East
Paterson, N.J., assignors to Nepera Chemical Co. Inc.,
Harriman, N.Y., a corporation of New York
No Drawing. Filed Sept. 24, 1959, Ser. No. 841,941
2 Claims. (Cl. 260—566)

This invention relates to the production of isonitroso-propiophenone:

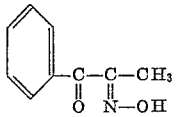

and in particular to an improvement in the method of of preparing this compound by the reaction of propiophenone with an alkyl nitrite by the reaction:

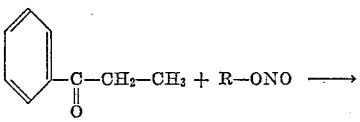

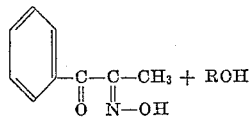

where R is an alkyl group.

Isonitrosopropiophenone is a valuable chemical intermediate since it may be hydrogenated to prepare 2-amino-1-phenyl-1-propanol, also known as phenylpropanolamine, which as a well known therapeutic agent useful as a bronchial dilator and nasal vasoconstrictor.

The production of isonitrosopropiophenone by the reaction of propiophenone with an alkyl nitrite is a well known reaction which is thoroughly described by Slater, J. Chem. Soc. (London) 117, 587–591 (1920), by Hartung et al., J. Am. Chem. Soc. 51, 2262–2266 (1929), and in Organic Synthesis, vol. 2, pages 363–364. In these methods of the prior art the reaction is carried out by the continuous addition of the alkyl nitrite, for example, methyl nitrite or butyl nitrite, to a solution of propiophenone in a large volume of ether. The quantity of ether used is generally about 5 volumes per volume of propiophenone. During the reaction hydrogen chloride which acts as a catalyst is supplied to the reaction mixture either continuously or intermittently. At the conclusion of the reaction, the reaction mixture is repeatedly extracted with a dilute caustic solution, the combined extracts are neutralized with concentrated hydrochloric acid and ice, the resulting crystals of isonitrosopropiophenone are recovered by filtration and finally are purified by crystallization from toluene.

The general procedures of the prior art, while useful in a laboratory scale operation, are not suited for economic operation on a commercial scale. The large volumes of ether required in the reaction not only add to the cost but also present serious hazards due to the flammable and explosive nature of ether. The necessity of adding hydrogen chloride either continuously or intermittently during the course of the reaction is still another factor which renders the prior art procedures impractical on a commercial scale. In the prior art methods, costly repeated extractions wtih a caustic solution followed by neutralization with hydrochloric acid are required to recover the product from the reaction mixture. In addition, the yield of isonitrosopropiophenone after recrystallization is in the order of 60 percent of theory or less and even after such recrystallization the resulting product has a melting point no higher than 113° C. indicating that the product is not entirely pure. While high purity might not be necessary for normal chemical uses, where the isonitrosopropiophenone is to be catalytically hydrogenated to phenylpropanolamine which is to be used therapeutically, it is apparent that the highest degree of purity for the intermediate is essential.

It is, therefore, a particular object of the present invention to provide an economic commercially feasible method of preparing isonitrosopropiophenone of high purity.

Other objects and the advantages of this invention will become apparent from the following detailed description.

It has now been found that propiophenone may be reacted with an alkyl nitrite in the presence of a lower alkyl aliphatic alcohol as the solvent for the reaction. It has also been found that the alcohol may be saturated with a definite quantity of hydrogen chloride at the start of the reaction which precludes the necessity of adding any further hydrogen chloride during the course of the reaction. In addition, it has been found that the product may be recovered from the reaction mixture at the conclusion of the reaction by merely adding water and recovering the crystals which form. The product so obtained is of high purity having a melting point in excess of 114° C.

In accordance with this invention propiophenone is reacted with a lower alkyl nitrite in the presence of a lower aliphatic alcohol having 1 to 3 carbon atoms. Alcohols useful as solvents in the reaction include methanol, ethanol, n-propanol and isopropanol, with methanol being preferred due to its ease of separation from the reaction mixture at the conclusion of the reaction. The alcohol solvent is present in the reaction mixture in an amount of about 0.3 to about 1 volume of alcohol per volume of propiophenone, with a quantity of between 0.55 and 0.60 volume of alcohol per volume of propiophenone being particularly effective. It is apparent, therefore, that the quantity of solvent used is considerably less than the 5 volumes per volume of propiophenone required by the methods of the prior art where ether is used as a solvent.

It is also a feature of the present invention that the hydrogen chloride which is required as a catalyst for the reaction of propiophenone with the alkyl nitrite may be supplied by dissolving hydrogen chloride in the alcohol solvent at the start of the reaction. Normally, about 0.4 to about 0.6 mol HCl per mol of propiophenone are used with a quantity of about 0.5 mol per mol being preferred. It has been found that this technique insures that sufficient hydrogen chloride is available throughout the course of the reaction. Thus, the necessity of continuously or intermittently adding hydrogen chloride to the reaction vessel as the reaction proceeds is eliminated.

The general reaction of propiophenone with a lower alkyl nitrite is a well-known organic chemical reaction and the particular temperature and time relationships form no part of the present invention. Normally, an alkyl nitrite containing 1 to 4 carbon atoms is used, for example, methyl nitrite, ethyl nitrite, n-butyl nitrite and the like. In the case of the higher boiling (normally liquid) organic nitrites such as n-butyl nitrite, the organic nitrite may be supplied drop-wise throughout the course of the reaction. Where a lower boiling (normally gaseous) organic nitrite such as methyl nitrite is used, it may be generated by adding sulfuric acid to a mixture of sodium nitrite and an alcohol such as methanol. This technique of generating an alkyl nitrite is entirely conventional. The organic nitrite is supplied to the reaction vessel over a period of about 2 to about 4 hours with the reaction temperature being maintained within the range of about 25° to about 35° by cooling. After completion of the addition of the organic nitrite, the reaction mixture is allowed to stand for about 4 to about 15 hours to permit optimum yields of the desired isonitrosopropiophenone.

It is a particular feature of the present invention that the isonitrosopropiophenone reaction product may be readily recovered from the reaction mixture merely by the addition of water followed by cooling to induce crystallization. Thus, a substantial improvement in the method of recovering the product is realized compared to the methods of the prior art in that repeated extractions with a caustic solution followed by neutralization with acid are not required. It has been found that a yield of isonitrosopropiophenone of up to 87 percent of theory based on the propiophenone charged to the reaction vessel is obtained by the method of this invention. In addition, a high purity product, white in color, and having a melting point in excess of 114° C. is readily obtained even without recrystallization of the material precipitated from the reaction mixture.

It is a further feature of the process of this invention that during the crystallization of the isonitrosopropiophenone from the reaction mixture an insoluble oil which is rich in unreacted propiophenone separates from the mother liquor. This oil may be recycled and charged to subsequent reaction batches to augment the yield of finished product. Where ether is used as a solvent for the reaction, in accordance with the methods of the prior art, it is possible to recover unreacted propiophenone only by distillation of the large volume of ethereal mother liquor which is normally obtained during said process.

The isonitrosopropiophenone prepared in accordance with this invention may be readily hydrogenated to the valuable bronchial dilator and nasal vasoconstrictor 2-amino-1-phenyl-1-propanol or phenylpropanolamine by conventional procedures. For example, the method described by Hartung et al., J. Am. Chem. Soc. 51, 2262–2266 (1929), may be used.

The following example is included in order further to illustrate the method of the present invention:

*Example*

To a reaction vessel, provided with cooling means, are charged 304 parts by weight of methanol, containing 91.0 parts by weight of hydrogen chloride, and 670 parts by weight of propiophenone. In another flask—used as a generator for methyl nitrite—is charged 243 parts by weight of water, 206 parts by weight of methanol and 414 parts by weight of sodium nitrite. The methyl nitrite is generated by adding a mixture of 391 parts by weight of concentrated $H_2SO_4$ in 433 parts by weight of water, from a dropping funnel, to the sodium nitrite mixture.

The rate of addition of the sulfuric acid to the sodium nitrite is controlled to extend over a period of 3¼ hours. The methyl nitrite is introduced below the surface of the propiophenone solution by means of a glass gas inlet tube, leading from the methyl nitrite generator. During the introduction of the methyl nitrite the reaction mixture is agitated and the temperature is maintained between 25°–30° C. The reaction mixture is then permitted to stand for 12 hours at a temperature of 25° C.

At the conclusion of the 12 hour period, the reaction mixture is agitated rapidly and 1000 parts by weight of water are slowly added to precipitate the product. The slurry is cooled to 10° C., the product centrifuged until no further oil is observed coming off the cake and the cake washed with 146 parts by weight of toluene. The final product, 709 parts by weight of isonitrosopropiophenone, is dried at 80° C. and has a melting point of 114.0°–116.5° C. This represents a yield of 87% based on the propiophenone charged. The oil separating during centrifugation is rich in unreacted propiophenone which is recycled.

It is understood that the foregoing detailed description is given merely by way of illustration and that many variations may be made therein without departing from the spirit of our invention.

Having described our invention, what we desire is to secure by Letters Patent is:

1. In a process for the production of isonitrosopropiophenone by the catalytic reaction of propiophenone with an alkyl nitrite having 1 to 4 carbon atoms in the alkyl group employing an inert organic solvent reaction medium containing hydrogen chloride as catalyst, the improvement which consists in carrying out said reaction by employing as the reaction medium from about 0.3 to 1.0 volume of an aliphatic alcohol of from 1 to 3 carbon atoms per volume of propiophenone reacted, said solvent medium containing from about 0.4 to 0.6 mol of hydrogen chloride per mol of propiophenone, and continuously adding said alkyl nitrite to said aliphatic alcohol reaction medium over a period of from two to four hours while maintaining the reaction temperature between about 25° C. and 30° C. and then precipitating the isonitrosopropiophenone formed by the addition of water to the solvent reaction medium and then separating the precipitated isonitrosopropiophenone therefrom.

2. In a process for the production of isonitrosopropiophenone by the catalytic reaction of propiophenone with methyl nitrite in an inert organic solvent reaction medium containing hydrogen chloride as catalyst, the improvement which consists in carrying out said reaction employing methanol as the reaction medium in a volume of from about 0.55 to 0.60 volume per volume of propiophenone reacted, said medium containing about 0.5 mol of hydrogen chloride per mol of propiophenone, and continuously adding said methyl nitrite to the methanol solution of propiophenone and hydrogen chloride over a period of from two to four hours while maintaining the reaction temperature between about 25° C. and 35° C. and then precipitating the isonitrosopropiophenone formed by the addition of water to the solvent reaction medium and then separating the precipitated isonitrosopropiophenone therefrom.

References Cited in the file of this patent
UNITED STATES PATENTS 2,248,035   Hartung et al. _____ July 1, 1941

FOREIGN PATENTS 517,624   Canada _____ Oct. 18, 1955

OTHER REFERENCES

Hartung et al.: "Organic Syntheses," vol. II, pages 363–364 (1943). (Copy in Pat. Off. Sci. Lib.)